Oct. 30, 1934.　　　　M. KLEIN　　　　1,978,750
GEARLESS GAUGE CONSTRUCTION
Filed Jan. 23, 1929
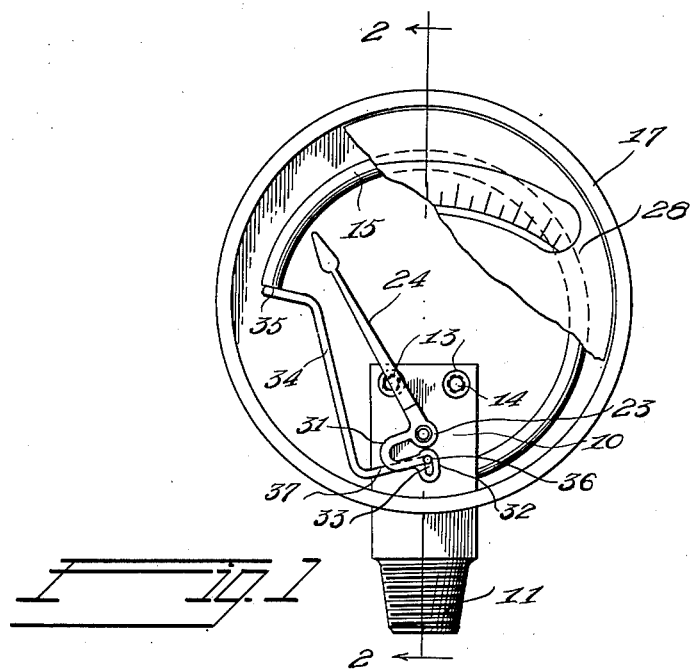
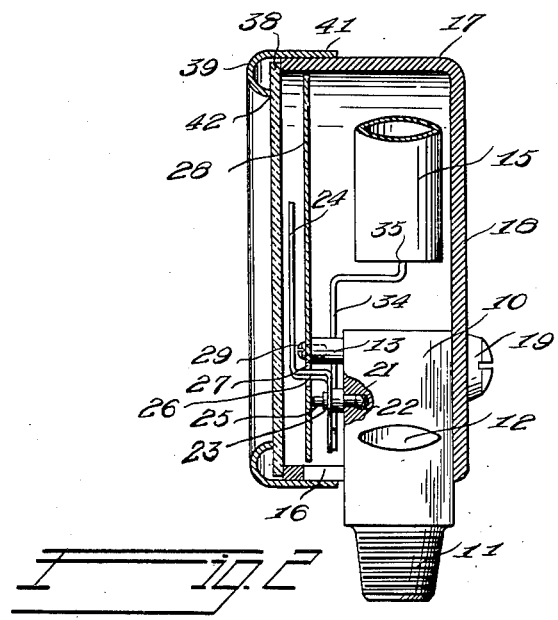
Inventor
Maximilian Klein
By
Strauch & Hoffman
Attorney Patented Oct. 30, 1934

1,978,750

UNITED STATES PATENT OFFICE 1,978,750

GEARLESS GAUGE CONSTRUCTION

Maximilian Klein, Sellersville, Pa., assignor to United States Gauge Company, New York, N. Y., a company of Pennsylvania Application January 23, 1929, Serial No. 334,428

6 Claims. (Cl. 73—109)

The present invention relates to a pressure or vacuum gauge of the Bourdon type and particularly to index hand actuating means, involving a direct link connection between the free end of said tube and said hand.

Gauges of this general character have been before proposed. This invention aims to improve on gauges of the type just stated by simplifying the construction of the gauge as a whole and of the parts that enter its construction, while at the same time providing a gauge made up of few parts so associated that accuracy in operation may be obtained, in spite of the inexpensive character of the construction, and so that adjustment of the index hand relative to its operative means may be effected in an extremely simple and effective manner.

It is accordingly a primary object of this invention to provide a gauge, of the general character above referred to, in which the above noted desirable features are secured.

It is a further object of the present invention to provide a gauge which is simple in construction, efficient in operation, inexpensive of manufacture and which is not subject to derangement when subjected to either external or internal vibrations.

It is a still further object of the present invention to provide a gauge of the Bourdon type, embodying in its construction, means for imparting movement of the Bourdon tube to the index hand which is light in weight and in substantially balanced relation and itself includes means for adjusting its connection to the tube thus avoiding many objectionable features heretofore present in gauges of this character.

It is a still further object of the present invention to provide a pressure or vacuum gauge of the Bourdon type in which movement of the Bourdon tube is imparted to the index hand by a direct connection which connection is so disposed relative to the tube and hand that accurate movement is imparted to said hand by said connection, in spite of the necessary lost motion arrangement forming a part of said connection.

A still further object of the present invention is the provision of a gauge comprising comparatively few simple parts adapted for expeditious assembly and disassembly.

With these objects in view as well as others that will become apparent from the following disclosure, reference will be had to the accompanying drawing forming part of same and in which:

Figure 1 is a front elevational view with some parts broken away and other parts removed of a pressure gauge illustrating a preferred embodiment of my invention.

Figure 2 is a vertical sectional view on a plane represented by line 2—2 in Figure 1 with some parts shown in elevation and partially broken away.

Referring to the drawing by reference characters in which like characters designate like parts 10 designates a post which is rectangular in cross section and which is provided with an integral threaded nipple 11 which has, as in usual practice, a central opening or passage communicating at the inner end thereof with an opening 12 in a side of post 10, the nipple 11 being adapted for suitable connection with a pressure source. The post 10 is preferably made of bar stock and is provided on the front face and adjacent the outer end thereof with a pair of transversely spaced and alined spacing members 13 which may be integral with post 10 or detachably secured thereto as desired. Each of said members 13 is provided with a tap 14.

A Bourdon tube 15 preferably slightly less than 275° in length has one end thereof soldered into the opening 12 in post 10. Post 10 with spacing members 13 and tube 15 assembled therewith is inserted through an opening 16 in the bottom of a casing 17 by threading the tube through said opening. The rear face of post 10 is disposed in engagement with the back 18 of casing 17 and detachably secured thereto by a screw 19, as indicated in Figure 2. The post 10 in the front face thereof and preferably on the vertical center line is provided with a bearing socket 21 in which is loosely and rotatably mounted a pointer or index hand pivot or trunnion 22 which may be riveted or otherwise secured in the hub portion 23 of a pointer or index hand 24. The pivot 22 is provided with an extension 25 and the index hand 24 is offset providing a right angle portion 26 extending through an aperture 27 in a dial 28, which is detachably secured to spacing members 13 by screws 29 engaging taps 14 with the inner face of dial 28 acting as a stop for extension 25 thus avoiding displacement of pivot 22 from socket 21. If desired the pivot 22 may be secured in post 10, and the hand rotatively mounted thereon. Integral with hub portion 23 of index hand 24 is one leg of a substantially U-shaped bendable tail member 31 the end of the opposite leg of which is provided with a right angularly disposed extension 32 provided with a slot 33. An angularly bent relatively light wire or rod 34 has the outer end thereof soldered in the free end of tube 15 as at 35 and the inner end thereof movably mounted in slot 33 as by a pin or projection indicated at 36.

It will be noted that slot 33 is so disposed that it extends in a direction parallel to a longitudinal central line through the index hand, the sides of the slot being disposed so that they are substantially parallel to the radial direction of movement of pin or projection 36 due to the movement of the free end of the tube in an endwise direction so that the index hand will move accurately in accordance with the radial, or substantially radial, expansion or contraction of said end, thus insuring accuracy of reading and permitting uniform calibration of the dial. It is to be further noted that the angular rod 34 comprises a portion 37 adjacent the inner end thereof which is substantially at right angles to the major length of rod 34 as well as to the slot 33 and that since the rod 34 is rigidly secured to the tube at 35, the pull through rod 34 as a result of movement of tube 15 is substantially normal to the length of slot 33 which, in various adjusted positions, is on a radius of hub member 23 thus further insuring an effective pull as well as an accurate movement of hand 24 in accordance with the radial movement of the free end of tube 15. It will be further noted that by the provision of the bendable tail member 31 adjustment can be readily effected in two directions or the resultant of these two directions thus permitting uniform calibration irrespective of the degree of adjustment that has been effected.

A crystal 38 may be detachably secured in position against the front open face of casing 17 by means of the beaded ring member 39 provided with a cylindrical extension 41 for frictional engagement with the outer cylindrical surface of casing 17 and with the inner edge 42 in bearing engagement with the outer face of crystal 38, or in any other approved manner.

From the foregoing disclosure it will be seen that an inexpensive gauge is provided without sacrificing durability and accuracy. The present construction meets the essential requirements of a commercial gauge in that it is exceptionally simple in construction and comprises only such parts as are absolutely essential in the construction of a gauge of this character. At the same time, the individual parts entering into the construction, are light in weight, and durable and the different parts are operatively connected in such manner that the accuracy and durability of the gauge is assured in actual service or even when subjected to the influence of internal or external vibration. Furthermore, the parts are mounted in substantially balanced relation and are capable of easy and accurate adjustment and the different parts are so connected as to make disassembly or assembly of the entire gauge a matter of extreme simplicity.

While I have disclosed but a single specific embodiment of my invention such is to be considered as illustrative only and not restrictive since the scope of my invention is defined in the subjoined claims.

What I claim and desire to secure by U. S. Letters Patent is:

1. In a fluid pressure gauge, a pivoted index hand provided with a hub and a U-shaped extension; one leg of said U-shaped extension being integral with said hub; the other leg of said U-shaped extension having an enlarged end portion provided with an elongated slot and being bendable in a plurality of directions to adjust the position of said portion; a fluid pressure operated means capable of endwise and radial movement; and a connecting member having one end rigidly secured to said means and the opposite end movably arranged in said slot.

2. The construction defined in claim 1 in which said slot extends substantially in the direction of movement of said connecting member due to the endwise movement of said means, so that said hand will move uniformly in accordance with radial movement of said means.

3. The construction defined in claim 1 in which said elongated slot is disposed so as to be substantially the same distance but on opposite sides of the vertical plane containing the longitudinal axis of the pivotal connection of said index hand in both extreme positions of said hands so that the movement thereof is substantially equal on opposite sides of said plane.

4. A pressure gauge comprising an open ended cylindrical casing; there being an opening in the cylindrical wall of said casing; a rectangular post extended through said opening in engagement with the back of said casing and detachably secured thereto; an externally threaded nipple integral with said post; said post being provided with an aperture in one side thereof in communication with the bore of said nipple; a tubular spring sector having an open end secured to said post and in communication with said aperture and a free closed end; an index hand pivotally secured to said post; a connection between said free closed end and said hand; spacers carried by said post; and a dial provided with an aperture and detachably secured to said spacers in spaced relation to said post; said index hand comprising parallel portions one on each side of said dial and a connecting right angularly disposed portion extending through said aperture in said dial.

5. In a pressure gauge, an expansible and contractible tubular sector; a supporting post having an inlet passage communicating with an open end of said sector; a hub having an index hand and provided with an integral bendable U-shaped extension; one arm of said U-shaped extension provided with an elongated slot adjacent the end thereof; means to pivot said hub on said post and a connection rigid with the free end of said sector for actuating said hand and carrying a pin movable in said slot.

6. A pressure gauge comprising a supporting post, having an inlet passage, a Bourdon tube mounted so that the operative end is capable of endwise and radial movement and having its open end in communication with said passage, an index hand pivoted on said post, an operating arm attached to said index hand, and a rod rigidly connected to the closed end of said Bourdon tube and attached to said arm by a lost motion connection permitting free motion of said rod with respect to said arm in a direction generally parallel to the direction of endwise movement of said tube whereby said arm is caused to move only in accordance with the radial movement of said closed end.

MAXIMILIAN KLEIN.